US011133996B2

(12) United States Patent
Balakrishnan et al.

(10) Patent No.: US 11,133,996 B2
(45) Date of Patent: Sep. 28, 2021

(54) METHOD AND SYSTEM FOR CONNECTIVITY DIAGNOSTICS IN COMMUNICATION SYSTEMS (71) Applicant: ASSIA SPE, LLC, Wilmington, DE (US)

(72) Inventors: Manikanden Balakrishnan, Foster City, CA (US); Ramya Bhagavatula, Mountain View, CA (US); Carlos Garcia Hernandez, Campbell, CA (US); Wonjong Rhee, San Francisco, CA (US)

(73) Assignee: ASSIA SPE, LLC, Wilmington, DE (US)

( * ) Notice: Subject to any disclaimer, the term of this patent is extended or adjusted under 35 U.S.C. 154(b) by 0 days.

(21) Appl. No.: 16/577,462

(22) Filed: Sep. 20, 2019

(65) Prior Publication Data
US 2020/0014611 A1 Jan. 9, 2020

Related U.S. Application Data (63) Continuation of application No. 15/471,779, filed on Mar. 28, 2017, now Pat. No. 10,454,797, which is a (Continued)

(51) Int. Cl.
H04L 12/26 (2006.01)
H04L 12/24 (2006.01)
H04W 24/08 (2009.01)

(52) U.S. Cl.
CPC ...... H04L 43/0811 (2013.01); H04L 41/0823 (2013.01); H04L 43/0852 (2013.01);
(Continued)

(58) Field of Classification Search
CPC . H04L 43/0811; H04L 43/0852; H04L 43/16; H04L 41/0823; H04W 24/08; Y04S 40/00
See application file for complete search history.

(56) References Cited

U.S. PATENT DOCUMENTS 8,929,212 B2 * 1/2015 Hama ...................... H04L 1/20
370/230
9,282,507 B2 * 3/2016 Schlatter ............... H04W 76/18
(Continued)

FOREIGN PATENT DOCUMENTS

| CN | 1707988 A | 12/2005 |
| CN | 1871866 A | 11/2006 |

(Continued)

OTHER PUBLICATIONS

Search Report for Indian Patent Application No. 992MUMNP2015, dated Jun. 30, 2019, (6 pgs).
(Continued)

Primary Examiner — Ajay Cattungal
(74) Attorney, Agent, or Firm — North Weber & Baugh LLP; Michael V. North (57) ABSTRACT Described is a method and system for connectivity diagnostics in communication systems. The method comprises: querying a first communication device at a first time and a second time to determine whether a second communication device is connected to the first communication device and to determine a value of an operational parameter at the first and second times; and determining the second communication device disconnected from the first communication device based on detecting the second communication device was connected to the first communication device at both the first time and the second time, and detecting the value of the operational parameter at the second time is inside a range of threshold values. In one embodiment, the method comprises determining a link is unstable for connectivity based on
(Continued)

connection duration, number and/or pattern of connection and/or disconnection events, and/or traffic activity during connection and/or disconnection events.

20 Claims, 8 Drawing Sheets

Related U.S. Application Data continuation of application No. 14/434,076, filed as application No. PCT/US2012/059391 on Oct. 9, 2012, now Pat. No. 9,900,228.

(52) U.S. Cl.
CPC ............ *H04L 43/16* (2013.01); *H04W 24/08* (2013.01); *Y04S 40/00* (2013.01)

(56) References Cited

U.S. PATENT DOCUMENTS

| | | | |
|---|---|---|---|
| 2002/0057784 A1* | 5/2002 | Cox | G06Q 20/32 379/218.02 |
| 2004/0063454 A1* | 4/2004 | Sasaki | H04W 28/18 455/522 |
| 2006/0182036 A1* | 8/2006 | Sasagawa | H04L 43/10 370/242 |
| 2007/0286222 A1* | 12/2007 | Balasubramanian | H04L 12/12 370/412 |
| 2010/0002879 A1* | 1/2010 | Risley | H04L 63/0428 380/255 |
| 2010/0166051 A1* | 7/2010 | Chung | H04M 3/304 375/225 |
| 2010/0304745 A1 | 12/2010 | Patel et al. | |
| 2012/0007553 A1* | 1/2012 | Ichikawa | B60L 53/18 320/109 |
| 2012/0094653 A1 | 4/2012 | Okuda | |
| 2012/0294158 A1* | 11/2012 | Boot | H04L 63/1416 370/252 |
| 2013/0007336 A1* | 1/2013 | Chun | G06F 1/266 710/316 |

FOREIGN PATENT DOCUMENTS

| | | |
|---|---|---|
| CN | 101053270 A | 10/2007 |
| CN | 101087172 A | 12/2007 |
| EP | 2073446 A1 | 6/2009 |
| WO | 2014011192 A1 | 1/2014 |

OTHER PUBLICATIONS

First Office Action dated Feb. 2, 2021 in related Chinese patent application No. 201910863959.0, (23 pgs).
Falaki et al., "A first look at traffic on smartphones", Publication: IMC '10: Proceedings of the 10th ACM SIGCOMM conference on Internet measurement, Nov. 30, 2010, (8 pgs).
Office Action dated Feb. 10, 2020 in the related Australian Patent Application No. 2018267677, (7 pgs).
Non-Final Office Action dated Mar. 10, 2020 in the related U.S. Appl. No. 16/279,584, (30 pgs).
AU Examination Report No. 3 dated Feb. 3, 2021 in related Australian Patent Application No. 2018267677, (5 pgs).
AU Examination Report No. 3 Response filed Feb. 8, 2021 in related Australian Patent Application No. 2018267677, (5 pgs).
The Extended European Search Report dated Mar. 19, 2021 in related European patent application No. 20177683.8, (13 pgs).
Telecom Management, "Digital cellular telecommunications system", European Telecommunications Standards Institute Sophia-Antipolis, France, Apr. 8, 2009, available from the Internet, <URL:https://ia803001.us.archive.org/3/items/etsi_ts_132_405_v08.05.00/ts_132405v080500p.pdf>, (167 pgs).
Telecom Management, "Digital cellular telecommunications system", European Telecommunications Standards Institute Sophia-Antipolis, France, Apr. 2011, available from the Internet, <URL:https://www.etsi.org/deliver/etsi_ts/132400_132499/132404/10.00.00_60/ts_132404v100000p.pdf>, (29 pgs).
Notice of Allowance dated Jul. 1, 2020 in related U.S. Appl. No. 16/279,584 16 pgs.
AU Examination Report No. 2 dated Aug. 21, 2020 in the related Australian Patent Application No. 2018267677, (4 pgs).

\* cited by examiner

METHOD AND SYSTEM FOR CONNECTIVITY DIAGNOSTICS IN COMMUNICATION SYSTEMS

CROSS-REFERENCE TO RELATED APPLICATIONS

This application is a continuation of previously filed copending U.S. patent application Ser. No. 15/471,779, entitled, "Method and System for Connectivity Diagnostics in Communication Systems," naming as inventors Manikanden Balakrishnan, Ramya Bhagavatula, Carlos Garcia, and Wonjong Rhee, and filed Mar. 28, 2017, which is a continuation of and claims priority to U.S. patent application Ser. No. 14/434,076, filed on Apr. 7, 2015, and titled "Method And System For Connectivity Diagnostics In Communications Systems," which is the 371 National Phase of PCT Application No. PCT/US2012/059391, filed Oct. 9, 2012, which applications are hereby incorporated by reference in their entireties.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The subject matter described herein relates generally to the field of computing, and more particularly, to a method and system for communication link measurement and/or diagnostics, including latency measurement and connectivity diagnostics.

BACKGROUND

Monitoring performance of a communication link is used, for instance, for proactively addressing and preventing user complaints, for deciding when to upgrade hardware associated with the communication link, for deciding when to trigger an optimization algorithm to optimize the communication link, for verifying that the optimization algorithm has indeed resulted in improved performance, etc.

The term "performance" herein refers generally to network throughput (e.g., TCP/UDP), latency, jitter, connectivity, error rates, power consumption, transmit power, etc. Improving performance of the communication system includes increasing throughput, reducing error rate and latency, improving jitter, power consumption, etc. for the communicating system. Monitoring performance generally refers to determining and/or calculating one or more of the above performance parameters associated with the communication link. The term "TCP" stands for transmission control protocol. The term "UDP" refers to user datagram protocol.

Communication system performance can be evaluated using traditional testing software applications such as iperf, netperf, ttcp, etc. Such software applications need to be installed on at least two communication devices where the software application on one communication device generates and transmits test data to the other communication device, and where the software application on the other communication device receives the test data.

After transmitting and receiving the test data, statistics of the test data transportation is evaluated to assess the performance of the communication link between the two communication devices. Testing of a communication system or network to gauge its performance via such traditional testing software applications requires compatible software applications to be installed or to be available at both communication devices that form the communication link.

For example, a user with a laptop visits a performance testing web site, and subsequently a testing software application is loaded to the user's web browser. Then the performance between the laptop and a server in the internet is measured using the testing software application that was already available at the server.

In some cases, however, it can be difficult, if not impossible, to have testing software applications available at both communication devices that are at the ends of the communication link of interest. For instance, when a network manager is interested in initiating a performance measurement from a Wi-Fi Access Point (AP) to a smart-phone, the network manager does not have any means to install a software application to the smart-phone. Therefore, the network manager cannot initiate performance measurement between the Wi-Fi AP and the smart-phone. In general, it is difficult to have applications available at communication devices coupled to a network or to initiate user-side installation of software applications as a network manager.

BRIEF DESCRIPTION OF THE DRAWINGS

Embodiments of the disclosure will be understood more fully from the detailed description given below and from the accompanying drawings of various embodiments of the disclosure, which should not be taken to limit the disclosure to the specific embodiments, but are for explanation and understanding only.

DETAILED DESCRIPTION

Described herein are systems and methods for determining communication link metrics.

Measuring or determining metrics for communication links, including latency and connectivity diagnostics, can provide data that is useful for a variety of applications. For example, determining the latency and/or connectivity diagnostics for a communication link can be used for: identifying causes of performance issues, proactively addressing and/or preventing user complaints, determining when to upgrade hardware and/or software, determining how and/or when to perform optimizations for a communication link or communication devices, and/or verifying optimizations resulted in improved performance.

Latency is a communication link metric that can be important in applications including video streaming (e.g., Internet Protocol television (IPTV)), real time applications (e.g., Voice over IP (VoIP), online gaming, and other real time applications), applications on mobile devices, and other applications impacted by latency.

In some communication systems in which latency can be measured, a communication device will enter a sleep state if there is no activity to conserve power. A device in a sleep state may not respond immediately to incoming packets, which can impact latency measurements. Wi-Fi stations (e.g., smart phones, mobile devices, and other client devices) are an example of communication devices that can enter a sleep state. Delays in responses caused by sleep states can add significant bias and randomness to latency test results (because, for example, the wait time due to the sleep state dominates the round trip time (RTT) of packets).

Connectivity is another communication link metric, and can indicate the stability of a communication link. Examples of applications in which connectivity diagnostics can be useful include: video streaming, real time applications, applications on mobile devices, and other applications impacted by connectivity issues.

Video streaming applications can require large average throughput between the communication devices. Connectivity issues can result in packet overflows within the internal buffers, which can cause instability to the communication device software.

Real time applications such as VOIP can require constant bit rate (CBR) streaming between the communication devices, and connectivity issues can create loss of packets or latency jitters that are detrimental to CBR applications.

Mobile devices (e.g., smart phones, netbooks, and other mobile computing devices) can have multiple communication interfaces (e.g., Wi-Fi, 3G/4G, and other communication interfaces) and have the ability to switch between the different networks. Link connectivity issues in one network (e.g., Wi-Fi) could cause the communication device to automatically switch to the other network (e.g., 3G or 4G) without the knowledge of the user. The user, when using broadband, could be exhausting his mobile data usage, while thinking that he is actually using the unlimited Wi-Fi access network. Additionally, frequent link disconnections and reconnections can result in network delays that have a direct impact on user applications.

Embodiments include systems and methods for determining latency of communication links between communication devices, at least one of which includes power-management features. Power-management features include software and/or hardware to enable states of greater or lesser power usage corresponding to varying levels of activity. For example, power-management features enable one or more "sleep states" which correspond to reduced activity levels, and one or more "non-sleep states" which correspond to higher or normal operating activity levels. In one embodiment, the sleep state of a communication device is detected and/or avoided when measuring latency of a communication link. For example, an agent (e.g., an agent within one communication device or external to the communication device) can issue commands to a second communication device to measure the latency, and also provide ways to detect and/or avoid the second device's sleep state. In one such embodiment, latency of the communication link can be measured without requiring availability of testing software applications on both sides of a communication link.

The sleep state of a communication device can be avoided with active probing. The term "active probing" generally refers to testing of a communication network by sending test pattern/data over the network from one communication device to another communication device. In one embodiment, active probing involves an agent which injects generated traffic to a target communication device. For example, in one embodiment, an agent in a Wi-Fi Access Point injects background traffic into layer 2 targeting a station. Although the injected traffic will be rejected from the upper layer of the station, the traffic will reach the Wi-Fi layer of the station and keep the station in a non-sleep state, or cause the station to exit a sleep state. In one embodiment, the agent issues latency measuring commands (e.g., ping commands, TCP synch/reset commands, and/or other latency measuring commands) after and/or during the injected traffic. In one embodiment, the agent measures the round trip time (RTT) of the latency measuring packets and corresponding response packets. In one embodiment, constant traffic prevents the destined communication device from going into a sleep state while the agent measures latency.

According to one embodiment, the volume of the injected traffic can be adjusted to keep and/or cause a communication device to be in a non-sleep state. In one such embodiment, the volume of injected traffic does not cause the link to be excessively busy or overwhelmed with the injected traffic. Limiting the injected traffic to prevent flooding of the communication link can prevent substantial bias in the latency measurements caused by the injected traffic. Once the desired latency measurements are obtained, the agent can stop injecting traffic. In one embodiment, measuring latency during and/or immediately after injected traffic eliminates inaccuracies in latency measurements caused by unpredictable wait times due to power-management states.

In one embodiment, an agent issues latency test commands successively without a wait time between them. The successive latency test commands result in a continuous stream of packets and prevent the target communication device from going into a sleep state. In one such embodiment, if the target communication device is in a sleep state when the agent issues the latency test commands, the target communication device may not transition to a non-sleep state prior to receiving a few packets (e.g., 2 packets, 3 packets, or more packets). The agent can check the status of the target communication device to determine if a given latency measurement is made when the target communication device is in a sleep state or a non-sleep state. For example, the agent can read the current status information data field before a latency probing packet, after a latency probing packet, or before and after a latency probing packet. In one embodiment, a Wi-Fi access point has information on the current status of each station connected to the Wi-Fi access point (e.g., whether the station is in a sleep state, in a non-sleep state, and/or other status information related to the station) due to the design of systems as specified in the IEEE 802.11 standard. Therefore, status information can be used to filter out the measurements and/or to interpret measurements accurately.

In one embodiment, an agent injects initial traffic (e.g., to wake up a target communication device or to keep the target communication device in a non-sleep state), and checks the status of the target communication device (e.g., reads the status information data field). Thus, in embodiments, the agent can determine when a target communication device is in a non-sleep state or a sleep state, and determine latency measurements with greater accuracy.

User applications running on a communication device can result in a variety of traffic patterns. In one embodiment, some user applications running on a communication device result in regular activity so that the communication device is likely in a non-sleep mode. If an agent measures latency during such a time, injecting artificial traffic to cause the device to be in a non-sleep state may be unnecessary. In one embodiment, some user applications may cause the communication device to enter a sleep state for periods of time. For example, if a communication device runs an application which does not require a large bandwidth, the communication device can be configured to enter a sleep state in between receipt and/or transmission of data for the application.

According to one embodiment, an agent measures the behavior of latency for an application. In one such embodiment, the agent generates an artificial traffic stream that has the statistical characteristics of the application, and measures latency at the moments that are of interest for evaluating user experience of using the application. Thus, latency can be measured at time moments that are chosen relative to the traffic pattern. For the example above where a communication device runs an application which does not require a large bandwidth, an agent can generate traffic similar to the application, allowing for the communication device to enter a sleep state for periods of time. Latency of a communication link can be measured at various times during the generated traffic, for example, at times when the communication device may be in a sleep state.

If the latency is large even after accounting for the power-management state of a target communication device, it indicates that the link may not be healthy (e.g., due to frequent packet losses, packet re-sends, transmission back-off because of the nature of wireless system where the common medium air is shared, or other causes of large latency). When such a large latency is detected, a corrective measure such as configuration optimization may be desired and can be triggered. Configuration optimizations are discussed in greater detail below with respect to FIGS. 1a-1c.

In one embodiment, by detecting and/or avoiding sleep states, systems and methods determine the latency of communication links with greater accuracy.

Embodiments include systems and methods for determining connectivity diagnostics of communication links. In one embodiment, connectivity diagnostics of the communication link can be determined without requiring availability of testing software applications on both sides of a communication link. In one embodiment, an operational parameter related to the communication link is used to diagnose connectivity. Communication devices, such as Wi-Fi access points (APs) or customer premise equipment (CPEs), provide operational parameters (OPs) (e.g., operational parameters 110 of FIGS. 1a and 1b, and operational parameters 110a-110n of FIG. 1c) as a byproduct of normal system operation. According to one embodiment, obtaining and monitoring OPs do not require test traffic to be injected into the network, and thus is non-intrusive to the user traffic.

One of the available OPs in some communication devices is the association-duration for links that are active on that communication device. In one embodiment, this association-duration OP is provided for each communication link in the form of a time counter. When a system connects or reconnects to a target communication device (e.g., when a new active link is established), a new association OP for that specific link gets instantiated in the target system with the duration count initialized to zero. The duration counter then starts incrementing cumulatively until the link gets disconnected. Upon link disconnection, the corresponding association OP gets deleted.

In one embodiment, an agent (e.g., an agent within the communication device or external to the communication device) performs fine-grained monitoring of connectivity by monitoring the association OPs periodically and/or frequently (e.g., every one minute on an ongoing basis, every five minutes for a period of time, or other frequencies and/or times). According to one embodiment, the agent keeps a record of the current active links and their association durations, and frequently tracks the system OPs to check if the previously recorded links are still active, if their duration counters are increasing continually, and/or if any new links have been initiated. During this monitoring process, the agent observes and can record critical events, including: instantiation events (i.e., the instantiation of an association OP, which identifies a new communication link connection), deletion events (i.e., the deletion of an association OP, which identifies a link disconnection), and/or reset events (i.e., instantiation or deletion was not recorded, but the counter got reset, which identifies quick reconnection of an existing link that happened between the agent measurements).

According to one embodiment, in addition to observing critical events, the agent determines the time of occurrence of critical events and/or traffic activity during the occurrence of critical events, which can also be obtained non-intrusively using the OPs.

In one embodiment, the agent uploads the recorded events periodically to a central server, where it is archived for large scale data analysis. The server (e.g., an application running on the server) analyzes, on a periodical (e.g., hourly, daily, weekly, or other periods of time) basis, one or more statistics for providing connectivity diagnostics for communication links. In one embodiment, an agent on the communication device can analyze connectivity events.

According to one embodiment, the agent can determine the total number of instantiation, deletion, and reset events. A high count can suggest link connectivity issues possibly depending on the correlation with other statistics. In another example, the agent determines the average duration between successive instantiation and deletion events, and between successive deletion and instantiation events. Long durations between successive instantiation and deletion events without frequent reset events in between can indicate a stable link, irrespective of the total number of events. Long durations between successive deletion and instantiation events can indicate an inactive link, and the percentage of link inactive periods can be considered for the overall diagnostics. A low number of critical events can indicate that the link was inactive for long periods of time rather than being unstable. Several reset events followed by link inactivity could indicate severe connectivity issues, where the communication system has declared that the link is unstable for maintaining connectivity.

According to one embodiment, the time pattern of the critical events can be analyzed to provide connectivity diagnostics. If the critical events happen frequently and contiguously in time, it can indicate connectivity issues. If the critical events are spread apart in time, and/or if there is a specific time pattern to the occurrence of events, then it could indicate a certain behavior of the communication device rather than link connectivity issues. Examples of communication device behavior that can create the critical events include: sleep or other power-saving states of communication devices, periodic restarts of communication devices, the mobility of wireless devices, channel/radio scan in wireless devices, low battery operation, and/or driver issues.

In one embodiment, an analysis server (e.g., management entity) or agent establishes a baseline trend for a communication link based on time patterns of the critical events. The server can then distinguish between communication device behavior and actual communication link problems, and diagnose connectivity issues.

According to one embodiment, connectivity diagnostics are performed during peak hours of network usage, which can more directly correlate with user experience. An analysis server or agent can correlate times of instability with traffic volume and/or patterns.

In one embodiment, an analysis server or agent can refine connectivity diagnostics by correlation with parameters such as RSSI (Received Signal Strength Indicator), interference, and/or other performance parameters, to determine a root cause of connectivity issues. For example, low RSSI at critical events can indicate disassociation at long range.

In one embodiment, an analysis server or agent can refine connectivity diagnostics by reading the identification of the communication devices which are being associated to at differing times. For example a Wi-Fi station may be between two APs, and be associating back and forth between the two. In another example, the association may alternate to being over Wi-Fi and over a cellular network.

According to one embodiment, connectivity diagnostics can be used to direct control actions and/or perform optimizations In one embodiment, systems and methods enable non-intrusive and light (e.g., not requiring intensive use of memory and/or processor(s)) means of measuring and estimating the connectivity performance of a communication link, which can be easily deployed in existing systems.

In the following description, numerous specific details are set forth such as examples of specific systems, languages, components, etc., in order to provide a thorough understanding of the various embodiments. It will be apparent, however, to one skilled in the art that these specific details need not be employed to practice the disclosed embodiments. In other instances, well known materials or methods have not been described in detail in order to avoid unnecessarily obscuring the disclosed embodiments.

The phrases "coupled to," "coupled with," connected to," "connected with" and the like are used herein to describe a connection between two elements and/or components and are intended to mean coupled/connected either directly together, or indirectly, for example via one or more intervening elements or via a wired/wireless connection. References to a "communication system" are intended, where applicable, to include reference to any other type of data transmission system.

The algorithms and displays presented herein are not inherently related to any particular computer or other apparatus nor are embodiments described with reference to any particular programming language. It will be appreciated that a variety of programming languages may be used to implement the teachings of the embodiments as described herein.

Figure 1A:
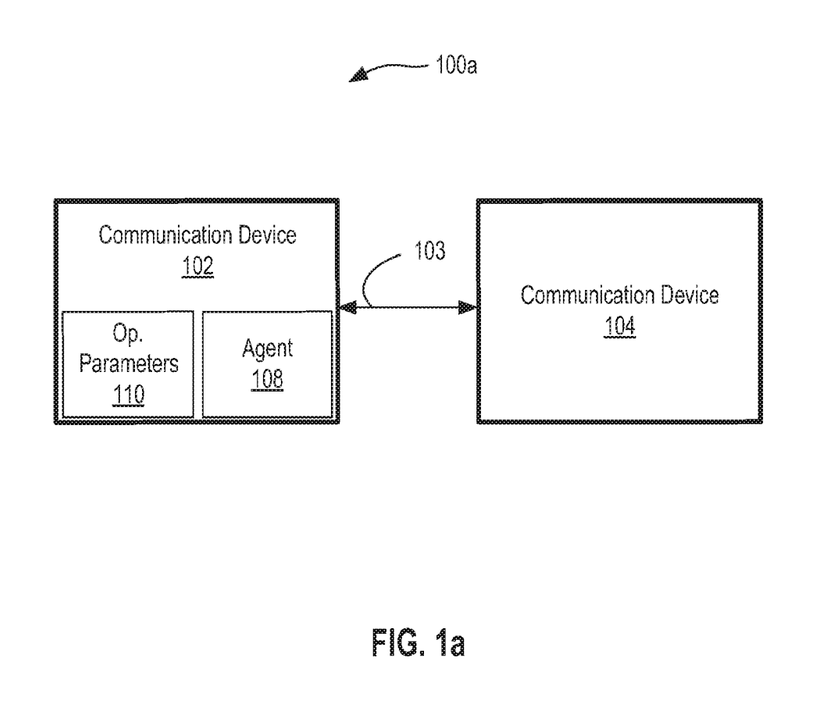
FIGS. 1a-1c illustrate communication networks which are operable to determine communication link metrics, according to embodiments.
Figure 1B:
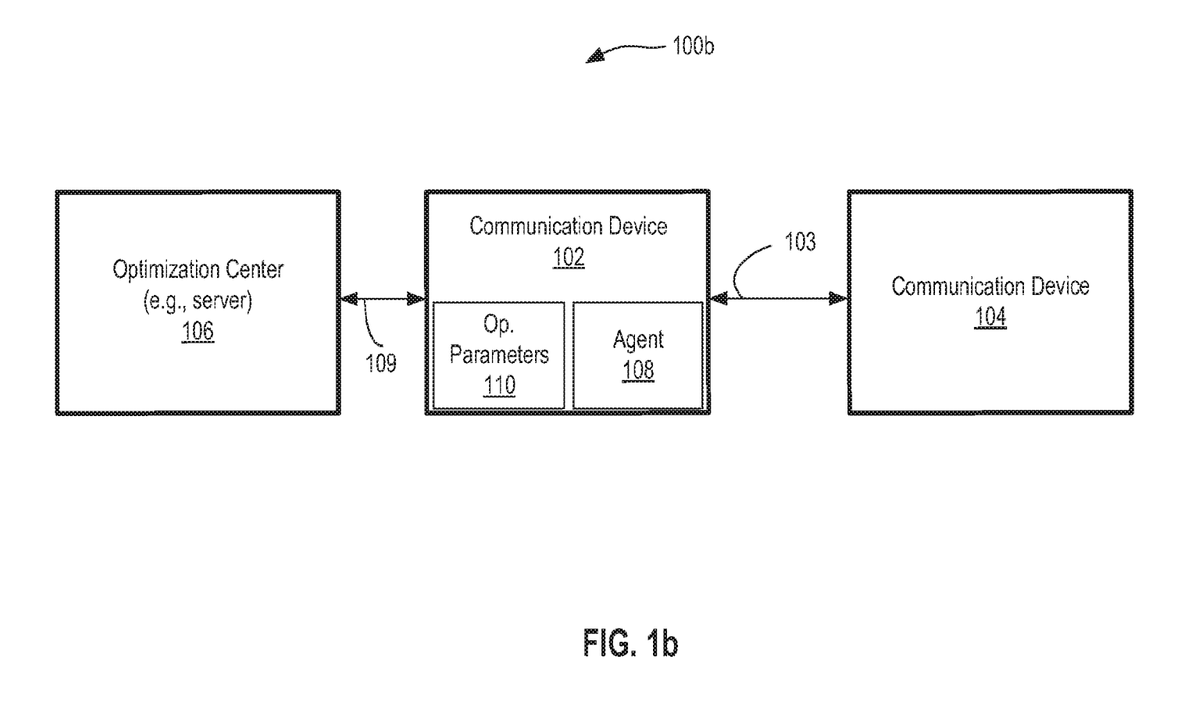
Figure 1C:
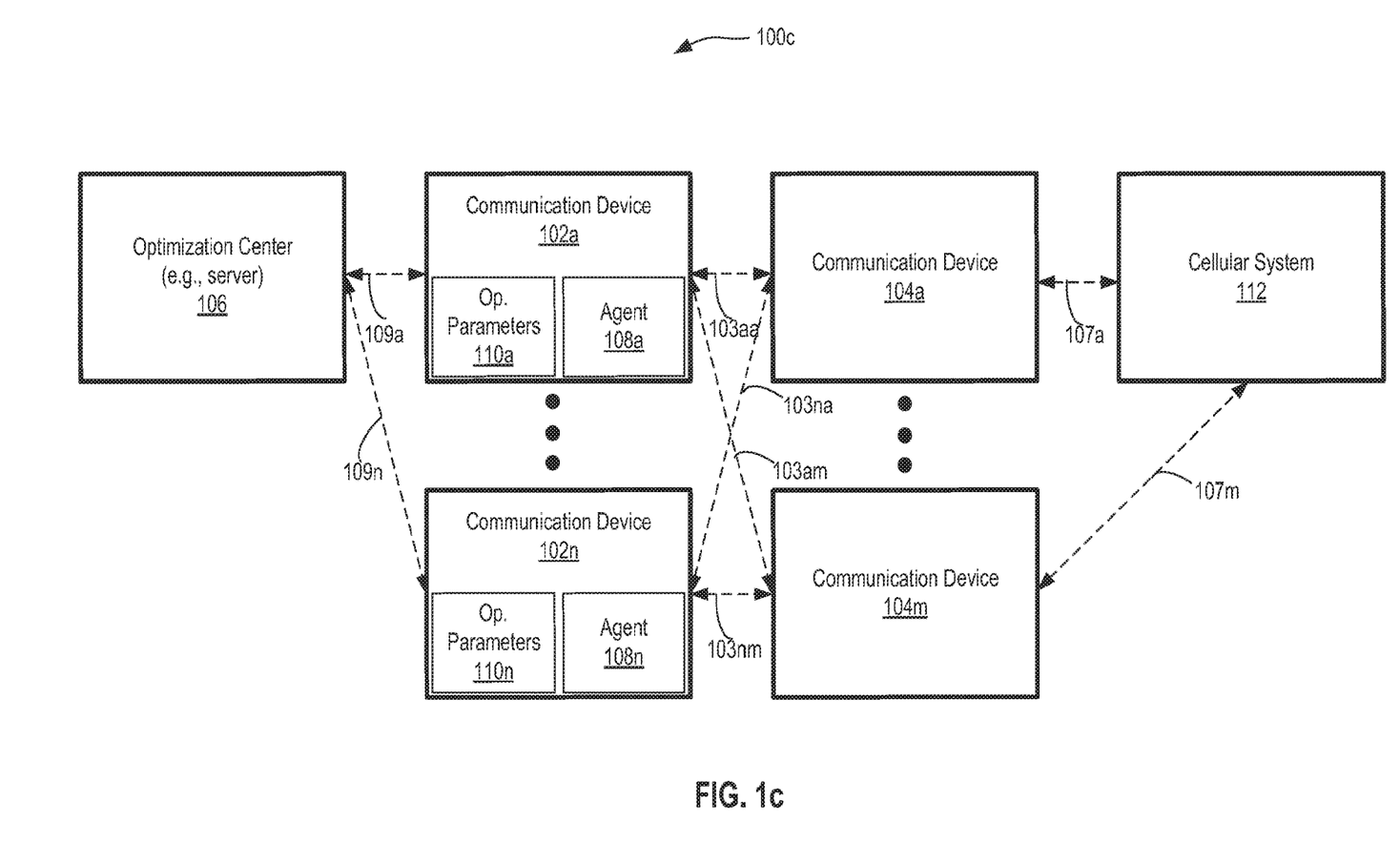

FIGS. 1a-1c illustrate communication networks which are operable to determine communication link metrics, according to embodiments. The embodiments in FIG. 1a and FIG. 1b illustrate communication networks 100a and 100b, which include a first communication device 102 communicatively coupled with a second communication device 104 via a communication link 103. Each of the first communication device and the second communication device can be selected from the group of devices including: a cellular telephony compatible device, a third generation (3G) compatible device; a fourth generation (4G) compatible device; a Long Term Evolution (LTE) compatible device; a Wi-Fi device; a Wi-Fi access point; a Wi-Fi station; a modem; a router; a gateway; a Digital Subscriber Line (DSL) Customer Premises Equipment (CPE) modem; an in-home power line device; a Home Phoneline Network Alliance (HPNA) based device; an in-home coax distribution device; a G.hn compatible device; an in-home metering communication device; an in-home appliance communicatively interfaced with the LAN; a wireless femtocell base station; a wireless picocell base station; a wireless small-cell base station; a wireless compatible base station; a wireless mobile device repeater; a wireless mobile device base station; an Ethernet gateway; a computing device connected to the LAN; a HomePlug device; an IEEE P1901 standards compatible access Broadband over Power Line (BPL) device; an Ethernet connected computer peripheral device; an Ethernet connected router; an Ethernet connected wireless bridge; an Ethernet connected network bridge; and an Ethernet connected network switch.

Communication network 100b also includes an optimization center 106 communicatively coupled with the first communication device 102 via communication link 109. FIG. 1c illustrates a communication network 100c, which includes one or more first communication devices 102a-102n, which may be communicatively coupled with one or more second communication devices 104a-104m via communication links 103aa-103nm, where 'n' and 'm' are positive integers. Communication network 100c includes an optimization center 106, which may be coupled with one or more communication devices 102a-102n via communication links 109a-109n. Communication network 100c also includes cellular system 112 (e.g., a 3G/4G system) which can be communicatively coupled with the second communication devices 104a-104m via communication links 107a-107m.

In one embodiment, the first communication devices 102, and 102a-102n can include: an access point (AP); a base station; a wireless local area network (LAN) device; a Digital subscriber line access multiplexer (DSLAM); a gateway; a performance enhancement device; a Digital Subscriber Line (DSL) CPE modem; an in-home powerline device; a Home Phoneline Network Alliance (HPNA) based device; an in-home coax distribution device; a G.hn (Global Home Networking Standard) compatible device; an in-home metering communication device; an in-home appliance communicatively interfaced with the LAN; a wireless femtocell base station; a wireless Wi-Fi compatible base station; a wireless mobile device repeater; a wireless mobile device base station; nodes within an ad-hoc/mesh network; an set-top box (STB)/set-top unit (STU) customer electronics device; an Internet Protocol (IP) enabled television; an IP enabled media player; an IP enabled gaming console; an Ethernet gateway; a computing device connected to the LAN; an Ethernet connected computer peripheral device; an Ethernet connected router; an Ethernet connected wireless bridge; an Ethernet connected network bridge; and/or an Ethernet connected network switch. In one embodiment, the first communication devices 102, and 102a-102n include operational parameters 110, and 110a-110n, which can be retrieved to aid in determining communication link metrics, as described below. In one embodiment, the second communication devices 104 and 104a-104m are Wi-Fi stations.

In some embodiments, the following may describe operations performed by an agent. The agent referred to can reside in one of the communication devices (e.g., agents 108, and 108a-108n of FIGS. 1a-1c), or external to the communication devices. For example, the agent referred to can reside in the optimization center 106, or in another external entity. In one embodiment, operations referred to as performed by the agent are partially performed by an agent in one of the communication devices, and partially performed by an agent external to the communication devices (e.g., by the optimization center 106). In one such embodiment, agents 108, and 108a-108n send relevant data to the optimization center 106, and the optimization center 106 performs analysis on the data. The optimization center 106 of FIGS. 1b and 1c is a computing device (e.g., a server, management entity, and/or other entity operable to perform optimizations for communication devices.

In one embodiment, the communication networks 100a-100c are operable to determine latency of the communication links 103, and 103aa-103nm, and/or determine connectivity metrics for the communication links 103, and 103aa-103nm. Although some of the following paragraphs regarding latency and connectivity metric determinations may refer to a single first communication and a single second communication device coupled via a single communication link (e.g., as illustrated in the communication network 100a of FIG. 1a and communication network 100b of FIG. 1b), the following description can also apply to an embodiment such as the communication network 100c illustrated in FIG. 1c with one or more first communication devices 102a-102n, and one or more second communication devices 104a-104m.

In one embodiment where the communication networks 100a and 100b are operable to determine the latency of the communication link 103, the communication networks 100a and 100b are operable to detect a sleep state of the second communication device 104 during the latency measurements, and/or prevent the second communication device 104 from being in a sleep state during latency measurements. For example, the first communication device 102 is operable (e.g., via the agent 108) to determine a power-management state of the second communication device 104. In one embodiment, possible power-management states of the second communication device include a sleep state and a non-sleep state.

In one embodiment, the power-management state of the second communication device 104 is a power-management state of a communication interface of the second communication device 104. In one embodiment, the power-management state of the second communication device 104 is a power-management state of any component of the second communication device 104 that influences latency measurement.

According to one embodiment, the first communication device 102 is to transmit one or more packets to the second communication device 104 over the communication link 103, the one or more packets to be received by the second communication device 104 while in the power-management state. In one embodiment, the first communication device 102 injects a set of packets for making multiple latency measurements. The first communication device 102 is to receive, from the second communication device over the communication link, one or more response packets in response to the one or more packets. The first communication device 102 determines the latency of the communication link 103 when the second communication device 104 is in the power-management state based on the one or more packets and the one or more response packets.

In one embodiment, determining the latency of the communication link 103 includes measuring a time from when the one or more packets are transmitted to the second communication device 104 to when the corresponding one or more response packets are received by the first communication device 102. One or more latency measurements can be made based on the multiple packets transmitted to the second communication device 104 for measuring latency and corresponding response packets.

According to one embodiment, the one or more packets transmitted by the first communication device 102 are ICMP echo request packets, and the one or more response packets transmitted by the second communication device 104 are ICMP response packets. For example, Ping, a software application/method to measure the round-trip time (RTT) between devices can be used. Ping requires both sender and receiver devices to have the software available at the application layer. Ping uses ICMP packets and reports average, minimum and maximum RTT in addition to RTT of each packet. Ping is included and made available in many operating systems (OS's).

In one embodiment, the one or more packets transmitted by the first communication device 102 are TCP Sync (SYN) packets sent to an unreachable port of the second communication device 104, and the one or more response packets transmitted by the second communication device 104 are TCP Reset (RST) packets. For example, the first communication device 102 intentionally sends a TCP SYN packet to an unreachable port of second communication device 104. When the TCP SYN packet is blocked, at default the receiver sends a TCP RST packet unless it is configured otherwise. Therefore, the RTT duration between the time the TCP SYN packet is sent to the time the TCP RST packet is received can be used to measure latency. In one embodiment, TCP SYN/RST packets can be used to measure latency in communication devices where the underlying MAC layer supports TCP and the firewall setting does not block such TCP SYN packets.

According to one embodiment, determining the power-management state of the second communication device 104 involves injecting traffic to cause the second communication device 104 to be in a non-sleep state for the latency measurement. For example, determining the power-management state of the second communication device 104 includes determining the second communication device 104 is in a non-sleep state after transmitting one or more initial packets to the second communication device 104, wherein the one or more initial packets cause the second communication device 104 to transition to a non-sleep state when received in a sleep state, and to remain in the non-sleep state when received in the non-sleep state.

In one embodiment, instead of first injecting traffic to cause the second communication device 104 to be in a non-sleep state, the first communication device 102 detects which power-management state the second communication device 104 is in, and measures the latency of the communication link 103 in that power-management state. For example, in one embodiment, determining the power-management state of the second communication device 104 includes retrieving status information of the second communication device 104. The status information can be available in communication device 102 (e.g., in a Wi-Fi system according to the implementation in the IEEE 802.11 standard). The status information retrieved can include operational parameters indicating whether the second communication device 104 is in a sleep state or a non-sleep state, and/or other operational parameters.

In one embodiment, the communication networks 100*a* and 100*b* are operable to both inject traffic to influence whether the second communication device 104 is in a non-sleep state or a sleep state, and to retrieve status information to aid in determining whether the second communication device 104 is in a non-sleep state or a sleep state.

In one embodiment, the communication networks 100*a* and 100*b* are further operable to determine latency characteristics of the communication link 103 based on multiple latency measurements and multiple determinations of the power-management state of the second communication device 104. Latency characteristics are, for example, statistics based on multiple latency measurements. Multiple latency measurements can be averaged or otherwise combined. In one embodiment, some of the latency measurements are discarded based on the power-management state of the second communication device 104 at the time of measurement. For example, if latency measurements not influenced by sleep states are desired, latency measurements made when the second communication device 104 is in a sleep state are discarded.

In one embodiment, the communication device 102 transmits the one or more packets to generate a traffic stream having statistical characteristics. For example, the communication device 102 or any other external server or device can generate a traffic stream having statistical characteristics of particular applications (e.g., user applications). In one such embodiment, determining latency characteristics of the communication link 103 with the traffic stream is based on multiple latency measurements and multiple determinations of the power-management state of the second communication device 104 while the traffic stream continues.

Thus, in one embodiment, a method and system for determining latency of communication links between communication devices results in latency measurements with greater accuracy.

In one embodiment where the communication networks 100*a* and 100*b* are operable to determine a connectivity metric of the communication link 103, an agent queries the first communication device 102 at successive times to read operational parameters at those times. For example, the agent queries the first communication device 102 at a first time to determine whether a second communication device 104 is connected to the first communication device 102 and to determine a value of an operational parameter at the first time. The operational parameter is related to the communication link 103 between the second communication device 104 and the first communication device 102. For example, the operational parameter can be a counter which resets upon connection and/or disconnection of the communication link 103; a global counter, which exists independently of the connectivity of the second communication device 104 to the first communication device 102; or other operational parameters related to the communication link 103.

Examples of counters include: association duration counters which indicate a connection duration of the communication link 103, traffic counters which indicate the number of packets and/or size of data transmitted between the first communication device 102 and the second communication device 104, and a beacon counter indicating a number of beacons transmitted by the second communication device 104. In one embodiment where the operational parameter to query is a beacon counter, the agent determines whether a disconnection event occurred based on both the value of the beacon counter and the beacon interval value. The beacon interval value can be known by the agent, or the agent may query the first or second communication device to determine the beacon interval value.

In one embodiment, the agent queries the first communication device 102 at a second time to determine whether the second communication device 104 is connected to the first communication device 102 and to determine a value of the operational parameter at the second time.

If the second communication device 104 was connected at both the first time and second time, and if the operational parameter at the second time is inside a range of threshold values, the agent can determine that a disconnection event occurred. For example, the agent determines the second communication device 104 disconnected from the first communication device based on detecting the second communication device was connected to the first communication device 102 at both the first time and the second time, and detecting the value of the operational parameter at the second time is inside a range of threshold values based on the operational parameter at the first time. In one embodiment where the operational parameter is a counter, a disconnection event can be identified if the value of the counter at the second time is less than an expected value, and/or less than the value of the counter at the first time. The expected value of the counter at the second time can be determined based on the value of the counter at the first time and time elapsed from the first time to the second time.

Although the above description refers to determining operational parameters at a first time and a second time, the operational parameters can be monitored multiple times, and/or continuously. For example, the operational parameters can be determined on a periodic basis (e.g., every one second, every five seconds, every one minute, every five minutes, or any other periodic basis).

In one embodiment, the agent determines the times of connection and disconnection events. For example, the agent determines times that the second communication device 104 connected to and disconnected from the first communication device 102. The agent further determines an average duration between connection and disconnection events for the communication link 103 based on those times (i.e., the times that the second communication device 104 connected to and disconnected from the first communication device 102).

In one embodiment, the agent determines an average duration between disconnection and reconnection events for the communication link 103 based on the times of connection and disconnection events (i.e., based on the times the second communication device 104 connected to and disconnected from the first communication device 102).

According to one embodiment, the agent detects traffic activity occurring at times of connection and disconnection events. For example, the agent queries the first communication device 102 to retrieve a second operational parameter from the first communication device 102 indicating traffic activity over the communication link 103. The detected traffic activity can be used in diagnosing connectivity issues.

In one embodiment, the communication link 103 is determined to be unstable based on statistical data related to connection and disconnection events. In one embodiment, the agent diagnoses connectivity issues for the communication link 103. For example, the agent determines that the communication link 103 is unstable for maintaining connectivity based on traffic activity during disconnection and reconnection events. In one embodiment, the agent determines that the communication link 103 is unstable for maintaining connectivity for the desired QoE (Quality of User Experience) in response to determining that a number of times that the second communication device 104 disconnected from and reconnected to the first communication device 102 exceed threshold values. According to one embodiment, the agent determines the communication link 103 is unstable for maintaining connectivity based on the average duration between connection and disconnection events being less than a threshold value.

In one embodiment, the agent identifies a time pattern in second communication device disconnections from and reconnections to the first communication device 102. The agent then determines if the communication link 103 is unstable for maintaining QoE based on the time pattern. For example, the agent determines the communication link 103 is unstable based on the second communication device disconnections and reconnections occurring contiguously in time. In one embodiment, the agent identifies a behavior of the second communication device 104 resulting in the time pattern, the identified behavior including one of: the second communication device 104 entering a sleep state, the second communication device 104 entering a lower power state, the second communication device 104 periodically resetting, the second communication device 104 exiting a coverage range for connectivity with the first communication device 102, the second communication device 104 performing a channel scan, and/or the second communication device 104 having a driver malfunction.

In one embodiment, the agent establishes a baseline behavior of the second communication device 104 (e.g., based on identified time patterns of connection and disconnection events). The agent can then determine whether the communication link 103 is unstable for maintaining connectivity or QoE based on whether connectivity behavior deviates from the baseline behavior of the second communication device 104.

According to one embodiment, the agent queries the first communication device 102 to retrieve a second operational parameter from the first communication device 102, the second operational parameter indicating at least one of: traffic activity over the communication link, received signal strength, and interference. The agent can then analyze the second operational parameter at times of connection events and disconnection events and determine whether the disconnection events are caused by a condition indicated in the second operational parameter.

Turning to FIG. 1c, in one embodiment, when there are multiple first communication devices 102a-102n available to connect to, the second communication devices 104a-104m can roam between the available first communication devices based on their internal roaming algorithm. Querying the first communication devices 102a-102n can determine if a second communication device is frequently connecting back and forth between the multiple available choices. One or more of the second communication devices 104a-104m may also alternate between connecting to one or more of the first communication devices 102a-102n and the cellular system 112. For example, when the first communication devices 102a-102n are Wi-Fi APs and the second communication devices are stations, the stations can alternate between connecting to two or more of the Wi-Fi APs, or one or more Wi-Fi AP and the cellular system 112.

In one such embodiment, the agent queries, when the second communication device (e.g., 104a) disconnects from the first communication device (e.g., 102a), another of the first communication devices (e.g., 102n) within a coverage range of the second communication device to determine whether the second communication device is connected to the other first communication device. The agent can then identify a pattern of times that the second communication device connects back and forth between the first communication device and the other of the first communication devices.

In one embodiment, the second communication device could be alternating between connecting to the first communication device and the cellular system 112. In one such embodiment, the agent queries, when the second communication device (e.g., 104a) disconnects from the first communication device (e.g., 102a), a cellular system 112 within a coverage range of the second communication device to determine whether the second communication device is connected to the cellular system. The agent can then identify a pattern of times that the station connects back and forth between the first communication device and the cellular system 112.

In one embodiment, one or more parameters of the first communication devices 102 and 102a-102n can be adjusted based on the determined latency and/or connectivity issues of the communication links 103 and 103aa-103nm. For example, the agent can adjust one or more of: a retransmission parameter, a modulation and coding scheme, a channel, a radio band, channel bonding, a guard interval length, a fragmentation threshold, a retry limit, a request to send (RTS) parameter and a clear to send (CTS) parameter, a beacon interval, a transmission power, a multiple antenna mode, a preamble setting, a maximum bit rate, and a Quality of Service (QoS) configuration parameter.

In one such embodiment, adjusting one or more parameters of the first communication devices can improve latency and/or connectivity.

FIGS. 2-5 are flowcharts for determining communication link metrics, according to embodiments. Methods 200, 300, 400, and/or 500 may be performed by processing logic that may include hardware (e.g., circuitry, dedicated logic, programmable logic, microcode, etc.), software (e.g., instructions run on a processing device to perform various operations such as interfacing, collecting, generating, receiving, monitoring, diagnosing, determining, measuring, analyzing, or some combination thereof). In accordance with one embodiment, there is a non-transitory machine-readable storage medium having machine executable instructions that when accessed by a computer, cause the computer to perform a method in accordance with one or more of methods 200, 300, 400, and/or 500.

In one embodiment, methods 200, 300, 400, and/or 500 are performed or coordinated via an apparatus such as the agent depicted at element 108, the optimization center depicted at element 106 of FIGS. 1a-1c, and/or other entities internal to or external from the communication devices described herein. Some of the blocks and/or operations listed below are optional in accordance with certain embodiments. The numbering of the blocks presented is for the sake of clarity and is not intended to prescribe an order of operations in which the various blocks must occur. Additionally, operations from the various flows 200, 300, 400, and/or 500 may be utilized in a variety of combinations, including in combination with each other.

Figure 2:
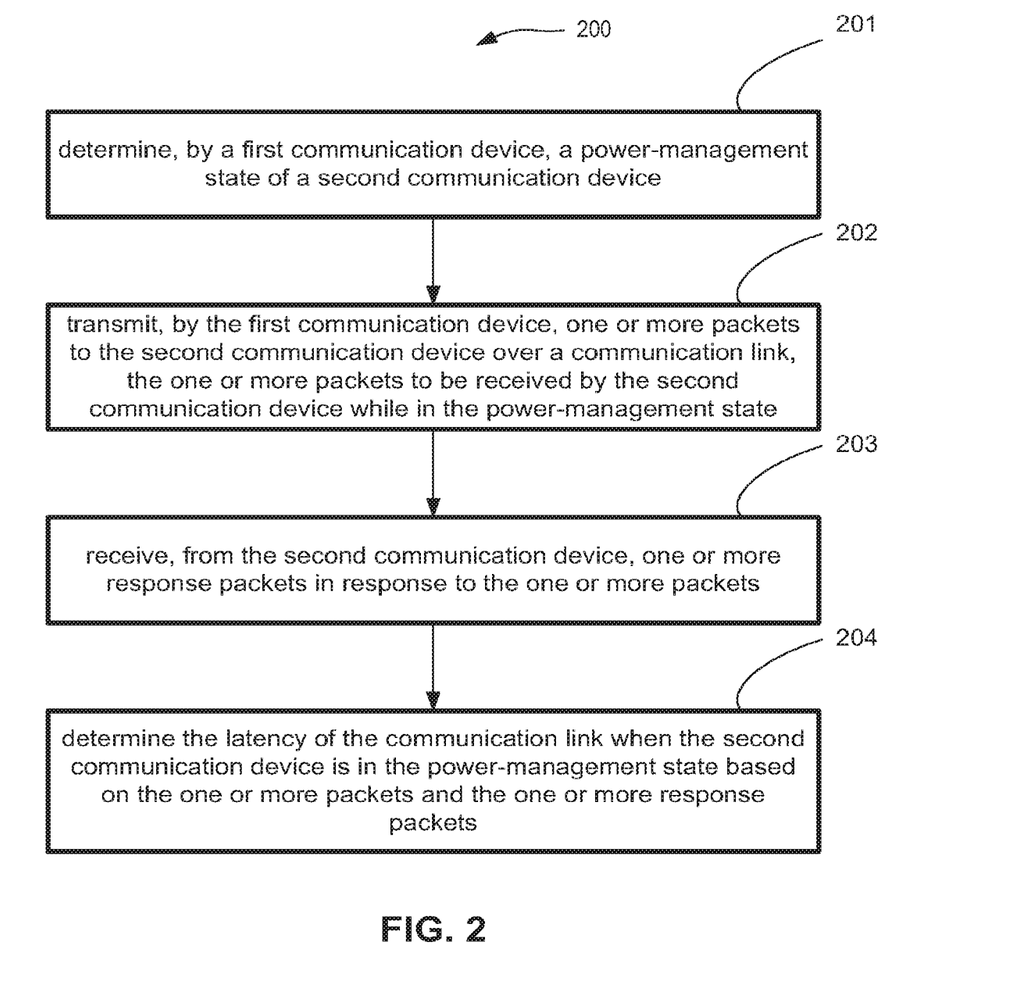
FIG. 2 is a flowchart for determining the latency of a communication link, according to one embodiment.

FIG. 2 is a flowchart for determining the latency of a communication link, according to one embodiment. Method 200 begins with a first communication device (e.g., first communication device 102 of FIG. 1a) determining a power-management state of a second communication device (e.g., second communication device 104 of FIG. 1a), as set forth at block 201.

At block 202, the first communication device transmits one or more packets to the second communication device, the one or more packets to be received by the second communication device while in the power-management state.

At block 203, the first communication device receives, from the second communication device over the communication link, one or more response packets in response to the one or more packets.

At block 204, the first communication device determines a latency of the communication link when the second communication device is in the power-management state based on the one or more packets and the one or more response packets.

In accordance with one embodiment, a management entity (e.g., optimization center 106 of FIGS. 1b and 1c) causes the first communication device to perform one or more of the above operations. For example, in one embodiment there is a non-transitory machine-readable storage medium having machine executable instructions that when accessed by a computer (e.g., an external management entity), cause the computer to perform a method, the method including: sending instructions to a first communication device to cause the first communication device to: determine a power-management state of a second communication device; and transmit one or more packets to the second communication device over a communication link, the one or more packets to be received by the second communication device while in the power-management state; wherein the first communication device is to receive, from the second communication device over the communication link, one or more response packets in response to the one or more packets; the method to further include determining a latency of the communication link when the second communication device is in the power-management state based on the one or more packets and the one or more response packets.

Figure 3:
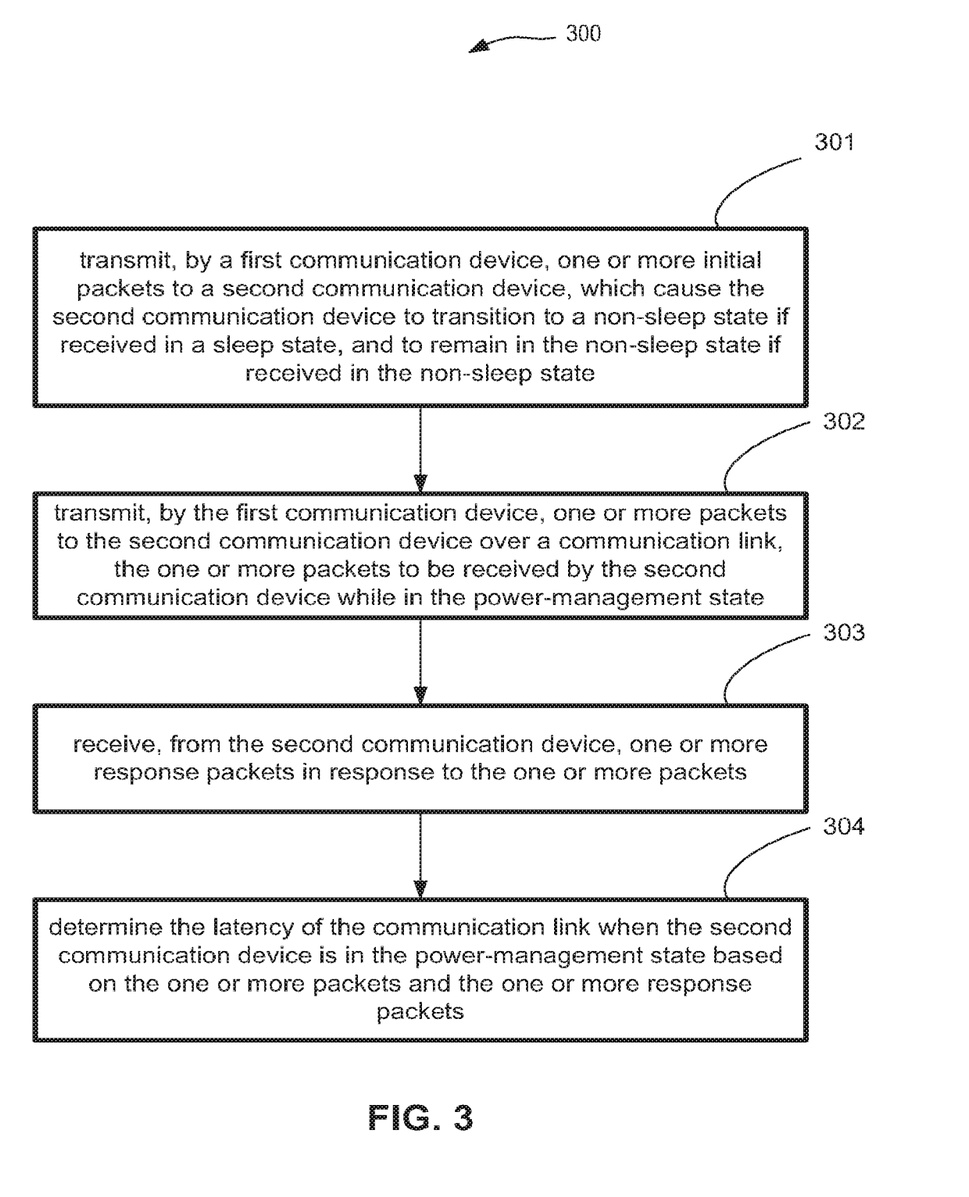
FIG. 3 is a flowchart for determining the latency of a communication link, including transmitting one or more initial packets to a communication device over a communication link, according to one embodiment.

FIG. 3 is a flowchart for determining the latency of a communication link, including transmitting one or more initial packets to a communication device over a communication link, according to one embodiment.

Method 300 begins at block 301, with a first communication device (e.g., first communication device 102 of FIG. 1a) transmitting one or more initial packets to a second communication device (e.g., second communication device 104 of FIG. 1a). The one or more initial packets cause the second communication device to transition to a non-sleep state when received in a sleep state, and to remain in the non-sleep state when received in the non-sleep state.

Method 300 continues in blocks 302-304 as method 200 in blocks 202-204 of FIG. 2. At block 302, the first communication device transmits one or more packets to the second communication device, the one or more packets to be received by the second communication device while in the power-management state.

At block 303, the first communication device receives, from the second communication device over the communication link, one or more response packets in response to the one or more packets.

At block 304, the first communication device determines a latency of the communication link when the second communication device is in the power-management state based on the one or more packets and the one or more response packets.

Figure 4:
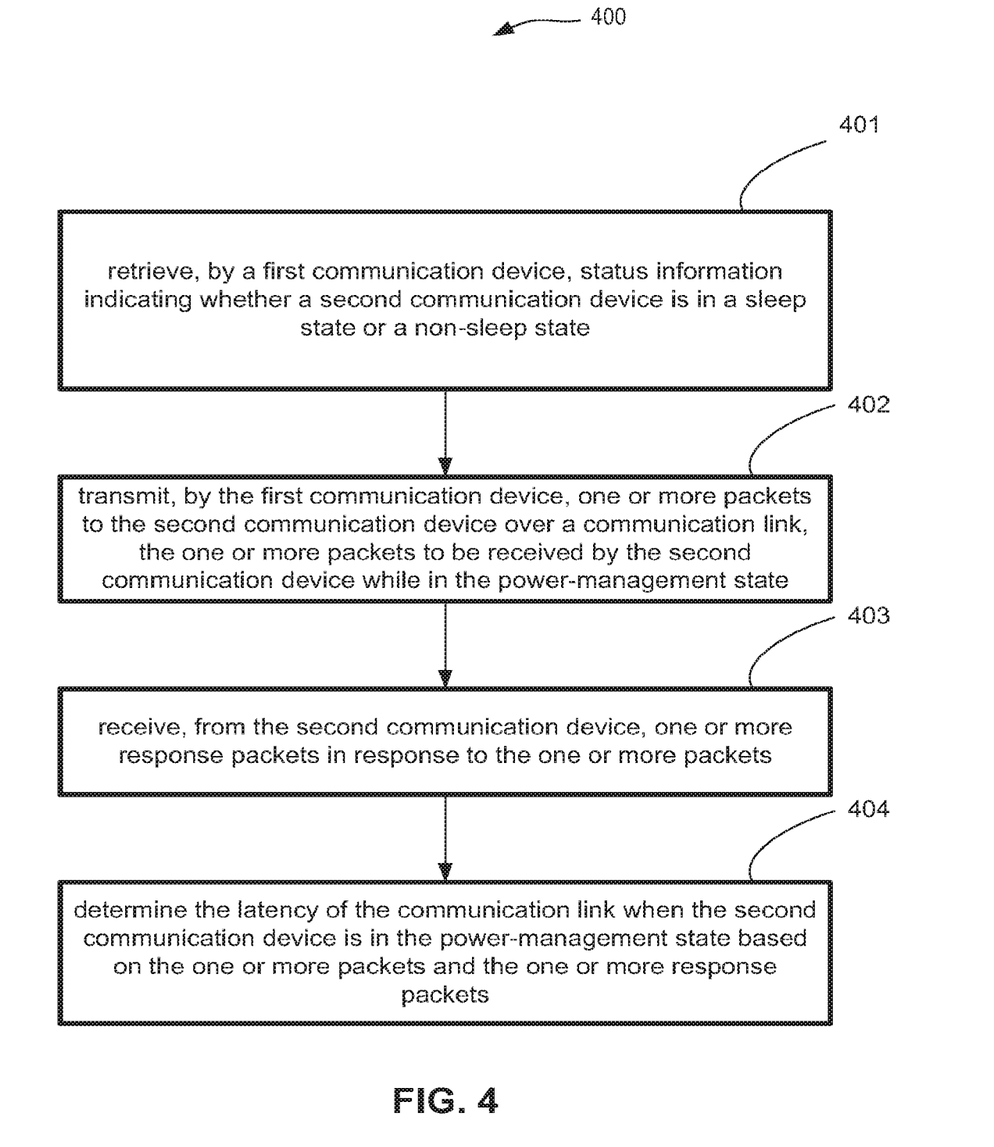
FIG. 4 is a flowchart for determining the latency of a communication link, including retrieving status information of a communication device, according to one embodiment.

FIG. 4 is a flowchart for determining the latency of a communication link, including retrieving status information of a communication device, according to one embodiment.

Method 400 begins at block 401, with a first communication device (e.g., first communication device 102 of FIG. 1a) retrieving status information indicating whether a second communication device (e.g., second communication device 104 of FIG. 1a) is in a sleep state or a non-sleep state.

Method 400 continues in blocks 402-404 as method 200 in blocks 202-204 of FIG. 2 and method 300 in blocks 302-304 of FIG. 3. At block 402, the first communication device transmits one or more packets to the second communication device, the one or more packets to be received by the second communication device while in the power-management state.

At block 403, the first communication device receives, from the second communication device over the communication link, one or more response packets in response to the one or more packets.

At block 404, the first communication device determines a latency of the communication link when the second communication device is in the power-management state based on the one or more packets and the one or more response packets.

Figure 5:
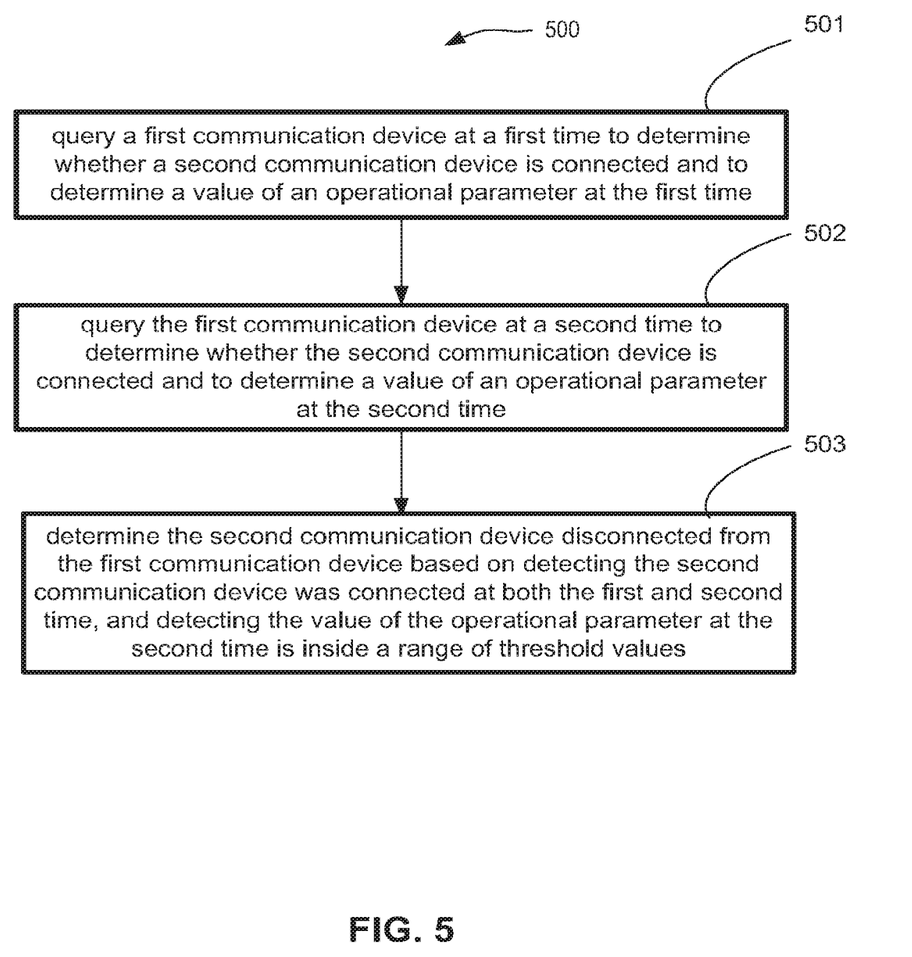
FIG. 5 is a flowchart for determining a connectivity metric of a communication link, according to one embodiment.

FIG. 5 is a flowchart for determining a connectivity metric of a communication link, according to one embodiment.

Method 500 begins at block 501, with querying a first communication device (e.g., first communication device 102 of FIG. 1a) at a first time to determine whether a second communication device (e.g., second communication device 104 of FIG. 1a) is connected to the first communication device and to determine a value of an operational parameter at the first time. The operational parameter is related to a communication link between the second communication device and the first communication device. Querying the first communication device can be performed by a management entity within the first communication device (e.g., agent 108 of FIG. 1a) or external to the first communication device (e.g., optimization center 106 of FIGS. 1b and 1c).

At block 502, the management entity queries the first communication device at a second time to determine whether the second communication device is connected to the first communication device and to determine a value of the operational parameter at the second time.

At block 503, the management entity determines the second communication device disconnected from the first communication device based on detecting the second communication device was connected to the first communication device at both the first time and the second time, and detecting the value of the operational parameter at the second time is inside a range of threshold values based on the operational parameter at the first time.

Figure 6:
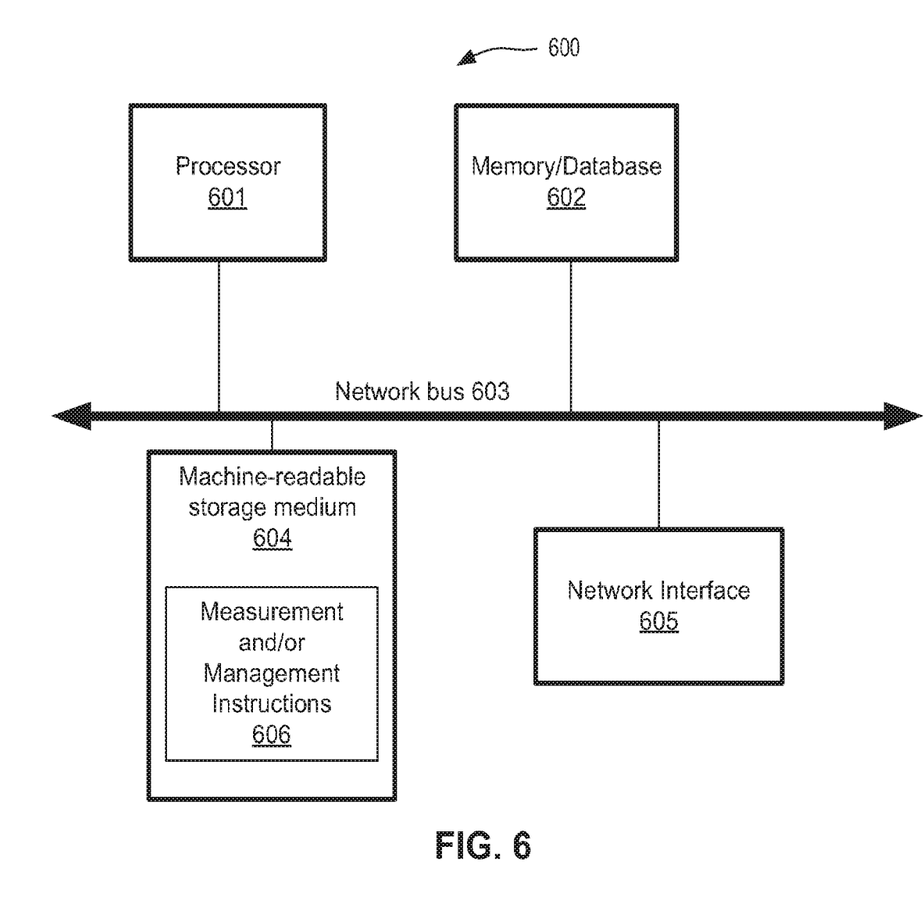
FIG. 6 is a processor-based system in accordance with which embodiments may operate, be installed, integrated, or configured.

FIG. 6 is a processor-based system 600 in accordance with which embodiments may operate, be installed, integrated, or configured.

The storage medium 604 and associated computer executable instructions 606 may be in any of the communication devices and/or servers discussed herein. The computer-machine-readable/executable instructions 606 are executed by a processor 601. Elements of embodiments are provided as machine-readable medium for storing the computer-executable instructions (e.g., instructions to implement the flowcharts of FIGS. 2-5 and other processes discussed in the description).

In one embodiment, the processor-based system 600 further includes a database 602 to store data used by the instructions 606. In one embodiment, the processor-based system 600 includes a network interface 605 to communicate with other devices. In one embodiment, the components of the processor-based system 600 communicate with one another via a network bus 603.

The machine-readable storage medium 604 may include, but is not limited to, flash memory, optical disks, hard disk drive (HDD), Solid State Drive (SSD), CD-Read Only Memory (CD-ROMs), DVD ROMs, RAMs, EPROMs, EEPROMs, magnetic or optical cards, or other type of machine-readable media suitable for storing electronic or computer-executable instructions. For example, embodiments of the disclosure may be downloaded as a computer program (e.g., BIOS) which may be transferred from a remote computer (e.g., a server) to a requesting computer (e.g., a client) by way of data signals via a communication link (e.g., a modem or network connection).

While the subject matter disclosed herein has been described by way of example and in terms of the specific embodiments, it is to be understood that the claimed embodiments are not limited to the explicitly enumerated embodiments disclosed. To the contrary, the disclosure is intended to cover various modifications and similar arrangements as would be apparent to those skilled in the art. Therefore, the scope of the appended claims should be accorded the broadest interpretation so as to encompass all such modifications and similar arrangements. It is to be understood that the above description is intended to be illustrative, and not restrictive. Many other embodiments will be apparent to those of skill in the art upon reading and understanding the above description. The scope of the disclosed subject matter is therefore to be determined in reference to the appended claims, along with the full scope of equivalents to which such claims are entitled.

The invention claimed is:

1. A method for connectivity diagnostics comprising:
    monitoring, at a first communication device, one or more operational parameters for connectivity of one or more communication links between the first communication device and one or more second communication devices;
    determining and recording one or more events based on the monitored one or more operational parameters;
    uploading the recorded one or more events to a computing device for connectivity diagnostics for the one or more communication links, the connectivity diagnostics comprises determining whether a second communication device, among the one or more second communication devices, decoupled from the first communication device; and
    optimizing a configuration of a first communication device based at least on whether the second communication device decoupled from the first communication device;
    wherein optimizing the configuration comprises varying, for the first communication device, one or more parameters.

2. The method of claim 1, wherein determining and recording one or more events further comprises at least one of:
    determining a time of occurrence for each of the one or more events; and
    determining traffic activity during occurrence for each of the one or more events.

3. The method of claim 1, wherein the one or more events comprise at least one of:
    an instantiation event for a new communication link;
    a link disconnection event for an existing communication link; and
    a reconnection event for an existing communication link.

4. The method of claim 1, wherein each of the one or more operational parameters is monitored at a first time and a second time to obtain a value of the each operational parameter at the first time and a value of the each operational parameter at the second time.

5. The method of claim 1, wherein each of the one or more operational parameters is a counter which resets upon coupling or de-coupling of a corresponding communication link.

6. The method of claim 5, wherein the counter is:
    a duration counter indicating a connection duration of the corresponding communication link;
    a traffic counter which indicates number of packets or size of data transmitted via the corresponding communication link; or
    a beacon counter indicating a number of beacons transmitted to the first communication device via the corresponding communication link.

7. The method of claim 1, further comprising:
    determining whether one communication link is unstable for maintaining connectivity based on a pattern of one or more determined events for the one communication link.

8. The method of claim 1, wherein the first communication device is:
    a cellular telephony compatible device;
    a third generation (3G) compatible device;
    a fourth generation (4G) compatible device;
    a Long Term Evolution (LTE) compatible device;
    a Wi-Fi device;
    a Wi-Fi access point;
    a Wi-Fi station;
    a modem;
    a router;
    a gateway;
    a Digital Subscriber Line (DSL) Customer Premises Equipment (CPE) modem;
    an in-home power line device;
    a Home Phoneline Network Alliance (HPNA) based device;
    an in-home coax distribution device;
    a G.hn compatible device;
    an in-home metering communication device;
    an in-home appliance communicatively interfaced with the LAN;
    a wireless femtocell base station;
    a wireless picocell base station;
    a wireless small-cell base station;
    a wireless compatible base station;
    a wireless mobile device repeater;
    a wireless mobile device base station;
    an Ethernet gateway;
    a computing device connected to the LAN;
    a HomePlug device;
    an IEEE P1901 standards compatible access Broadband over Power Line (BPL) device;
    an Ethernet connected computer peripheral device;
    an Ethernet connected router;
    an Ethernet connected wireless bridge;
    an Ethernet connected network bridge; or
    an Ethernet connected network switch.

9. A non-transitory computer-readable medium or media comprising one or more sequences of instructions which, when executed by one or more microprocessors, causes the steps to be performed comprising:
    monitoring one or more operational parameters for connectivity of one or more communication links between a first communication device and one or more second communication devices;

determining and recording one or more events based on the monitored one or more operational parameters; and performing connectivity diagnostics for the one or more communication links based on at least the one or more events, the connectivity diagnostics comprises determining whether a second communication device, among the one or more second communication devices, decoupled from the first communication device; and optimizing a configuration of a first communication device based at least on whether the second communication device decoupled from the first communication device;

wherein optimizing the configuration comprises varying, for the first communication device, one or more parameters.

10. The non-transitory computer-readable medium or media of claim 9, wherein performing connectivity diagnostics for the one or more communication links comprises analyzing a time pattern related to one or more of:

power-saving states of one or more communication devices coupled to the first communication device via the one or more communication links;

periodic restarts of one or more communication devices coupled to the first communication device via the one or more communication links;

mobility of one or more wireless devices coupled to the first communication device via the one or more communication links;

channel or radio scans in one or more wireless devices coupled to the first communication device via the one or more communication links;

low battery operation of one or more communication devices coupled to the first communication device via the one or more communication links;

one or more driver issues of one or more communication devices coupled to the first communication device via the one or more communication links;

channel or radio scans in the first communication device;

low battery operation of the first communication device;

one or more driver issues of the first communication device;

association of the first communication device to a Wi-Fi network; and association of the first communication device to a cellular network.

11. The non-transitory machine-readable storage medium of claim 10, wherein performing connectivity diagnostics for the one or more communication links further comprises distinguishing the analyzed time pattern from communication link problems.

12. The non-transitory machine-readable storage medium of claim 9, wherein performing connectivity diagnostics for the one or more communication links comprises reading identification of one or more communication devices which are associated to at different times.

13. The non-transitory machine-readable storage medium of claim 9, wherein each of the one or more operational parameters is monitored at a first time and a second time to obtain a value of the each operational parameter at the first time and a value of the each operational parameter at the second time.

14. The non-transitory machine-readable storage medium of claim 9, wherein each of the one or more operational parameters is a counter which resets upon coupling or de-coupling of a corresponding communication link.

15. The non-transitory machine-readable storage medium of claim 14, wherein the counter is:

a duration counter indicating a connection duration of the corresponding communication link;

a traffic counter which indicates number of packets or size of data transmitted via the corresponding communication link; or a beacon counter indicating a number of beacons transmitted to the first communication device via the corresponding communication link.

16. A communication system comprising:

a first communication device in communication with one or more second communication devices via one or more communication links respectively, the first communication is operable to:

monitor one or more operational parameters for connectivity of the one or more communication links;

determine and record one or more events based on the monitored one or more operational parameters; and upload the record of one or more events; and a management entity communicatively coupled to the first communication device to receive the uploaded record of one or more events, the management entity implements connectivity diagnostics for the one or more communication links based on the recorded one or more events, the connectivity diagnostics comprises determining whether a second communication device, among the one or more second communication devices, decoupled from the first communication device, the management entity optimizes a configuration of a first communication device based at least on whether the second communication device decoupled from the first communication device, optimizing the configuration comprises varying, for the first communication device, one or more parameters.

17. The communication system of claim 16, wherein the one or more events comprise at least one of:

an instantiation event for a new communication link;

a link disconnection event for an existing communication link; and a reconnection event for an existing communication link.

18. The communication system of claim 16, wherein each of the one or more operational parameters is a counter which resets upon coupling or de-coupling of a corresponding communication link.

19. The communication system of claim 18, wherein the counter is:

a duration counter indicating a connection duration of the corresponding communication link;

a traffic counter which indicates number of packets or size of data transmitted via the corresponding communication link; or a beacon counter indicating a number of beacons transmitted to the first communication device via the corresponding communication link.

20. The communication system of claim 16, wherein the management entity determines whether one communication link is unstable for maintaining connectivity based on a pattern of one or more determined events for the one communication link.

* * * * *